US010394835B1

(12) United States Patent
Rickrode (10) Patent No.: US 10,394,835 B1
(45) Date of Patent: **\*Aug. 27, 2019**

(54) RAPID ACCESS INFORMATION DATABASE (RAID) SYSTEM AND METHOD FOR GENERALIZED DATA AGGREGATION FOR A PLETHORA OF DATA TYPES AND USERS

(71) Applicant: C. Joseph Rickrode, Nashua, NH (US)

(72) Inventor: C. Joseph Rickrode, Nashua, NH (US)

( * ) Notice: Subject to any disclaimer, the term of this patent is extended or adjusted under 35 U.S.C. 154(b) by 432 days.

This patent is subject to a terminal disclaimer.

(21) Appl. No.: 15/401,591

(22) Filed: Jan. 9, 2017

Related U.S. Application Data

(60) Provisional application No. 62/286,109, filed on Jan. 22, 2016.

(51) Int. Cl.
*G06F 16/00* (2019.01)
*G06F 16/2458* (2019.01)
*G06F 21/60* (2013.01)
*G06F 16/25* (2019.01)

(52) U.S. Cl.
CPC ........ *G06F 16/2471* (2019.01); *G06F 16/252* (2019.01); *G06F 21/604* (2013.01)

(58) Field of Classification Search
CPC ... G06F 16/2471; G06F 16/252; G06F 21/604
See application file for complete search history.

(56) References Cited

U.S. PATENT DOCUMENTS

| | | | |
|---|---|---|---|
| 7,882,122 B2 * | 2/2011 | Wong | G06F 16/9577 707/760 |
| 8,756,248 B1 * | 6/2014 | Rickrode | G06F 16/27 707/770 |

\* cited by examiner

*Primary Examiner* — Alexander Khong
(74) *Attorney, Agent, or Firm* — Luis Figarella (57) ABSTRACT

A method and system for providing a rapid access data aggregation information source having a contact portal for rapidly connecting to single or multiple information resources, e.g., databases or retrieval portals, in order to provide owner approved access to various types of remotely readable, addressable, and/or interaction-capable information resources. A focal intention of the data aggregation system is to provide rapid response support through a contact point for locating and contacting a specific database, potentially among a multitude of databases, which holds specific information, located mainly by its type, characteristics, or generic category such as but not limited to medical/ health coverage details, medical records, legal documents, estate details, etc.

17 Claims, 7 Drawing Sheets

#Aid47Poverty: Take ACTION To Attack The 47 Million US Poverty"

"Millions Are Starving! That's Just NOT Right!"

The 2008 40 Million US Poverty Level Has Risen to 47 Million in 2014. Things Are Getting Worse! ACTION is Need NOW! We're LOSING the Battle!

"An Action Plan Under Study Can Launch <u>Perpetual Poverty Relief</u> & Have <u>Donor Payback</u> Benefits Too!"
No Government Delays!    ALL Humanitarians Will LOVE It!

An "#Aid47Poverty" Program <u>CAN</u> Become a <u>PERPETUAL COMMITMENT</u> of the 273 million Americans NOT in poverty, especially if <u>DONOR PAYBACK</u> is included!

*Few among us cannot spare the price of a pizza, burger, or sub and a drink 2 or even 4 times a year to feed a child, veteran, or our elderly?*

- Children are 21% of the 47 million! What have the helpless ones done?
- Veterans fought for our "Land of the Free." Is poverty our payback to them?
- Many elderly are hungry, even homeless, due to disappearing pensions!
- Average ANNUAL INCOME of those in poverty is $13,138 – <u>PITIFUL!</u>

Figure 6

The DONOR PAYBACK is a THANK YOU for Giving!
A Unique Rapid Access Portal to a Plethora of YOUR Key Information Now In Boxes, Folders, Drawers & PC Files

This DONOR ONLY System is Named: "RAID"
Rapid Action Information Database

- Internet accessed from anywhere via Smart Phone, Tablet, PC, etc.
- Provides a direct portal to the "universe" of all your information databases
- Establishes the first user customized, maintained, & access controlled universal electronic filing cabinet "system" accepting virtually any files
- Provides accelerated electronic portal access to Medical/Emergency Responders & Law Enforcement when critical time can mean life or death

RAID Brings "Dual Action Rewards" From GIVING:
- AID for POVERTY Victims Desperately Needing Help
- AID for DONORS When "Unexpected Information Needs" Arise

User Defined RAPID Point & Click "Samples" for:
- *Wills, Birth Certificates, Deeds, Marriage License, Jewelry Appraisals*
- *Drivers License data & Auto Insurance details (appearing on card)*
- *Emergency road service, e.g. AAA, phone, member identity number, etc.*
- *List of emergency contact names & numbers (often relatives)*
- *Medications, dosage, & doctors with contacts + Emergency medical info: blood type, pre-existings (heart, seizure, cancer, pacemaker, allergies, etc.)*
- *Health Insurance company, agent, contact no., policy no. + Medicare info*
- *Life insurance preliminaries: carrier, agent, contact, etc. + Home (fire & casualty) insurance including carrier, agent & contact number, etc.*

Two Donor Levels: #1 - $10 @ 2-4x/yr   #2 - $20 @ 2-4x/yr
- Level 2 = more categories, controls, printables, external up/down load, etc.

Figure 7

RAPID ACCESS INFORMATION DATABASE (RAID) SYSTEM AND METHOD FOR GENERALIZED DATA AGGREGATION FOR A PLETHORA OF DATA TYPES AND USERS

CROSS-REFERENCE TO RELATED APPLICATIONS

This application claims priority to U.S. Provisional patent application Ser. No. 62/286,109 titled "A Rapid Access Information Database (RAID) System and Method for generalized data aggregation for a plethora of data types and users" filed on Jan. 22, 2016 the disclosure of which is herein incorporated by reference in its entirety.

PATENTS CITED

The following documents and references are incorporated by reference in their entirety, Klughart (U.S. Pat. Nos. 9,015,355 and 9,164,946), and Rickrode (U.S. Pat. No. 8,756,248).

FIELD OF THE INVENTION

Throughout this work, where a reference to "data" occurs as alone, it can mean figures or numerical as well as (alpha, numeric, or alphanumeric) information produced or stored, per the Merriam-Webster Dictionary. The interpretation applied will be that which aligns with the sense in which it is used. Also, the terms data and information will be used interchangeably throughout. Similarly, owner includes authorized user where/as appropriate.

The present invention is directed to a system and method for providing any or all of rapid location, identification, retrieval, input, editing, arranging, cataloging or download and uploading of data which in present day practices is broadly scattered, not readily located or accessible, and may exist in a potential plethora of hard copy, electronic media, and others not readily accessible, inaccessible without an authorization approval regimen, and/or potentially not accessible by authorized agents or requiring a pre-approval regimen, e.g., relatives, etc., at all or without a substantial time delay, often in emergency events where time is of the essence.

Such "rapid access" occurs through a wireless or wired communication device such as a smart phone, tablet, personal computer, terminal, etc. allowing connection and interaction with one or more databases for the purpose of rapid data examination and manipulation. This is especially beneficial in situations where time is of the essence or an emergency event arises.

The extent of such retrievable information may be specified and arranged by owner, defined by guidelines from the originating authorities such as health care providers, insurance companies, financial institutions, etc. This rapid access data aggregation concept will provide ready availability to the plethora of information types and media typically broadly spread and stored throughout ones environment but may not be readily retrievable, easily located or accessed, or in a physical format/media not compatible with rapid recovery or delivery.

DESCRIPTION OF THE RELATED ART

With great frequency, the need arises to produce or provide and organize data, information, details, specifics, and even related proof of the many aspects surrounding and influencing our daily lives and the activities therein. Such needs may relate to events in our lives requiring the showing or proof of identity, rendering specific dates or data, confirming current enrollment or active status, providing right-to-access proof, confirming specific medications or medical history events and details, providing auto, health, home, disaster and other insurance enrollment, coverage and currency, etc.

Existing examples of such need for details and specifics are heard and seen on all types of media, experiences from friends, guidelines from service delivery providers, etc. In many cases, one needs to consider the specific need or requirement to self-determine where such "requested specifics" are stored or found in ones, typically disorganized, information system of diverse media mixtures. All too often today, the media utilized is not compatible with the application with which one needs to interact. This is especially true where traditional paper based documents, photographs, lists and the like need to interact with computer electronic files. This condition is encountered with paper based information, documents, etc. held through the years by the elderly. The elderly rarely catalogue and organize paper documents; and, current generations rarely retain paper.

Presently, even a broad selection of electronic exchange media exists since computing practices, languages, programs, and transfer media have rapidly evolved over the last 40 years of wide spread computer usage and the simultaneous, competitive evolution of Microsoft and Apple technologies along with a few other competitors.

As time goes by and the diverse mix of providers which one must interact with continues to expand, the number of individual computerized databases could expand substantially making the process of getting the needed information when delivery time matters is going to get progressively more complicated (and longer in delivery time) in situations where a potential life altering event may be in progress or swift medical data, perhaps multiple-sourced, would save a life. Rapid delivery of key, relevant medical information plus doctors and their contact details can not only saves lives but also can prevent significant and/or irreversible physical harm, loss of life, and even death risks if victims or incorrectly treated.

The typical anomalies of significance needing to be dealt with in such emergency medical situations include determining: pre-existing conditions, treatment regimens for such conditions, current medications, allergic reactions, and dosages, access to specific medical records, perhaps verbal consults with the specific doctors involved, etc. In life threatening events it can also be critical to access victim directives such as DNR and conditions under which these directives apply. Other key information in such situations is organ donor questions. It is critical that such information be immediately available in many cases.

In the case of an emergency medical event where the victim cannot communicate, an agent authorized by the victim, spouse, relative, etc., could be pre-authorized to access the victims RAID database and provide to the emergency care rendering parties all the event relevant RAID recorded specifics directed by the victim. The RAID database should include a clear, perhaps printable, authorization confirmation so that both the relative/authorized agent and the care givers can substantiate said authority if the victim is incapacitated. Said relative's or authorized agent's legal level of authorization for direct or assisted accessing of the RAID proprietary database; any owner's, relative's or owner authorized agent's pre-existing or emergency response type guidelines should be convey clear pre-approved by the owner of record; etc.

Existing technologies could substantially help rapid, specific, discrete information recovery if there existed a normalized information access point such as RAID which could be prepared, populated, and all problems resolved before a time critical event occurred. The primary electronic system weaknesses and sheer failures today stem from the time required to identify designated emergency contacts, contacts knowledgeable about pre-existing, and lack of communication uniformity to assemble the centralized communication portal.

Many more and more serious weaknesses and failures stem from yesteryear practices such as not identifying and communicating any pre-existing and situation relevant information, locating, retrieving and making said information accessible, periodic screening such information for currency and event relevance, establishing cross communication between involved, often medical, resources prior to an emergency, plus managing any rights to access information and related authorization issues.

The foregoing focused a medical example because virtually everyone has encountered such situations personally or via an acquaintance. Similar lack of details, documents, responsible individuals, etc. apply to a plethora of life's situations. In past generations, paper documents of relevance were kept in shoe boxes, sock drawers, file cabinets, home and/or bank lock boxes and safes, on and on, and quite often not organized or categorized in any formal fashion for rapid recovery, should the need arise. With the advent of electronic record keeping and handling methods, the existence and location of many paper documents of importance such as deeds, wills, bill-of-sales, birth and death certificates, insurance policies, marriage licenses, et al., are often unknown.

The Generation X and later individuals have been increasingly shedding the use of paper, primarily for sales receipts initially but rapidly expanding to all paper evidence trails except for those deemed most critical to them. Millenials may not even be aware that critical documents affecting their lives once only existed in paper form such that they may not receive life insurance payouts, property deeds, stock certificates which could significantly alter their lives. An organized, managed transition to electronic management and coordination of life's significant aspects and events seems worthwhile.

What is needed, is a centralized aggregation system capable of immediately supporting all the data owner's and/or authorized agent's, relative, attorney, et al. approved and access provided for by the data owner, need to access clear, accurate and complete information dictated or required by any event's circumstances at hand in a timely fashion, while ensuring that the appropriate bona fides (authorizations, legal, liability, competency and other technicalities) have been established and satisfied so that the one or more required functional entities, authorities or involved service provider individuals can provide assistance and know that they will be "held harmless" by following the RAID provided directives as recorded by the owner or focal person to which the information applies.

Data owner herein connotes the individual with primary responsibility for approving what data does and does not get stored in or accessed through the discrete data portal to his/her rapid access information database (RAID).

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect the invention is about a computer implemented rapid access information database (RAID) portal system for data collection and aggregation, said system comprising a rapid access information database (RAID) portal comprised of one or more central RAID servers or contact points capable of direct or assisted accessing of external data, said RAID servers isolated from direct user access and capable of establishing a pre-authorized and approved direct or assisted interface to one or more external proprietary services having systems and databases capable of obtaining either permanent or transient data elements within said proprietary services; said proprietary services servers or assisted access forming a network (RAID NET), interfacing components for data owners or authorized agents to access said RAID portal system and legally authorize the level and conditions under which said permanent or transient data elements residing in said one or more proprietary services databases may be accessed directly or with assistance and provided through said RAID portal system, interfacing and action originating components allowing said data owners or authorized agents to define and initiate a broadcast or query about the permanent or transient data elements for one or more of their data types retained by said RAID portal to said RAID NET, communication components for secure interfacing to said RAID portal by data owners, authorized agents or their intermediaries utilizing said RAID portal system defined access practices, legal clearance components to establish the valid specific legal level of access of each said intermediary to each said permanent or transient RAID NET stored data elements and to approve or deny said intermediary's access to said permanent or transient data elements and RAID portal components to aggregate, locate, and compare any responses about said permanent of transient data elements from said RAID NET and communicate appropriate permanent or transient data elements to the appropriately cleared data owner, authorized agent or their intermediaries.

In another aspect said permanent data elements include attributes comprised of at least one of characteristics such as Owner's information (including name, address, phone numbers), owner authorized agent's information (incl. name, address, phone numbers) and said transient data elements include non-fixed attributes that change over time or through the ongoing activities or operations. In yet another aspect, one or more said owner, authorized agent or their intermediary use said RAID access to request the exercise of control over said data directly, if so authorize, or through the RAID portal to said external proprietary services system's connection to said data system. In another aspect, said legal clearance components comprise written, electronic or verbal legal clearance components defining extent of access to the RAID servers and to said independent external proprietary services systems and databases as applicable. In yet another aspect, one or more system modules using said RAID access as the system interfacing components to execute a data owner's or authorized agent's request to perform at least one of the following or similar functions by one or more of the data controls; locate data in the RAID NET system, turn on access, read, edit, delete type functions, turn off access, read, edit, delete type functions, activate RAID portal monitoring for specific activities or disable some portion of RAID portal monitoring.

In another aspect, one or more system modules using said RAID access as the system interfacing components to allow an intermediary to execute an authorized owner's or authorized agent's requests to respond in a pre-defined manner on their behalf to transient data differing from at least one of the following or similar conditions; said data being outside an owner's or authorized agent's expected parameter zone, said data being utilized or controlled in a manner not consistent with owner's or authorized agent's permission or intended use, one or more activities or a frequency of activities violating or exceeding a specified criteria or threshold. In yet another aspect, one or more system modules using said RAID access as the system interfacing components for an intermediary who is permitted to exercise an owner's or authorized agent's request to respond in a pre-defined manner on their behalf to automatically alert one or more intermediaries after an uncommon event or activity is observed, or similar unexpected change in status occurs.

In one aspect, the invention is about a computer implemented rapid access information database (RAID) portal method for data collection and aggregation, said method comprising, providing access to a rapid access information database (RAID) portal comprised of one or more central RAID servers or contact points capable of direct or assisted accessing of external data, said RAID servers or contact points isolated from direct user access and capable of establishing a pre-authorized and approved direct or assisted interface to one or more external proprietary services having systems and databases capable of obtaining either permanent or transient data elements within said proprietary services; said proprietary services servers or assisted access forming a network (RAID NET), providing interfacing components for data owners or authorized agents to access said RAID portal system and legally authorize the level and conditions under which said permanent or transient data elements residing in said one or more proprietary services databases may be accessed directly or with assistance and provided through said RAID portal system, providing interfacing and action originating components allowing said data owners or authorized agents to define and initiate a broadcast or query about the permanent or transient data elements for one or more of their data types retained by said RAID portal to said RAID NET, providing communication components for secure interfacing to said RAID portal by data owners, authorized agents or their intermediaries utilizing said RAID portal system defined access practices, providing legal clearance components to establish the valid specific legal level of access of each said intermediary to each said permanent or transient RAID NET stored data elements and to approve or deny said intermediary's access to permanent or transient data elements and providing RAID portal components to aggregate, locate, and compare any responses about said permanent of transient data elements from said RAID NET and communicate appropriate permanent or transient data elements to the appropriately cleared data owner, authorized agent or their intermediaries.

In one aspect, the invention is about a non-transitory computer-readable medium embodying a program executable in at least one computing device, the program, when executed, causing the at least one computing device to at least access a rapid access information database (RAID) portal comprised of one or more central RAID servers or contact points capable of direct or assisted accessing of external data, said RAID servers isolated from direct user access and capable of establishing a pre-authorized and approved direct or assisted interface to one or more external proprietary services having systems and databases capable of obtaining either permanent or transient data elements within said proprietary services; said proprietary services servers or assisted access forming a network (RAID NET), interact with interfacing components for data owners or authorized agents to access said RAID portal system and legally authorize the level and conditions under which said permanent or transient data elements residing in said one or more proprietary services databases may be accessed directly or with assistance and provided through said RAID portal system, interact with interfacing and action originating components allowing said data owners or authorized agents to define and initiate a broadcast or query about the permanent or transient data elements for one or more of their data types retained by said RAID portal to said RAID NET, access communication components for secure interfacing to said RAID portal by data owners, authorized agents or their intermediaries utilizing said RAID portal system defined access practices, employ legal clearance components to establish the valid specific legal level of access of each said intermediary to each said permanent or transient RAID NET stored data elements and to approve or deny said intermediary's access to said permanent or transient data elements; and employ RAID portal components to aggregate, locate, and compare any responses about said permanent or transient data elements from said RAID NET and communicate appropriate permanent or transient data elements to the appropriately cleared data owner, authorized agent or their intermediaries.

With appropriate security measures and access controls, the Rapid Access Information Database (RAID) portal system could accommodate inputs by authorized entities such as updated insurance policies, renewed licenses, certificates of ownership, etc.

In addition, with appropriate security measures and access controls, the Rapid Access Information Database (RAID) portal system could become the collection and consolidation point for statements of upcoming payments due and a control center for managing all such payments and their timing to balance funds inflow and outflow.

The Rapid Access Information Database (RAID) portal system is intended to provide our ever expanding "electronics dependent generations" a Life Management System controlled and managed by and adaptable to devices such as the ever evolving smart phone, tablet, PC and voice controlled devices, to the extent practical.

BRIEF DESCRIPTION OF THE DRAWINGS

FIGS. 6-7 illustrate various demonstrative flyers of the invention advantages, according to an illustrative embodiment of the invention.

The above-described and other features will be appreciated and understood by those skilled in the art from the following detailed description, drawings, and appended claims.

DETAILED DESCRIPTION OF THE PREFERRED EMBODIMENT

To provide an overall understanding of the invention, certain illustrative embodiments and examples will be described in the foregoing. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may have been made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications may be referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the foregoing description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Figure 1:
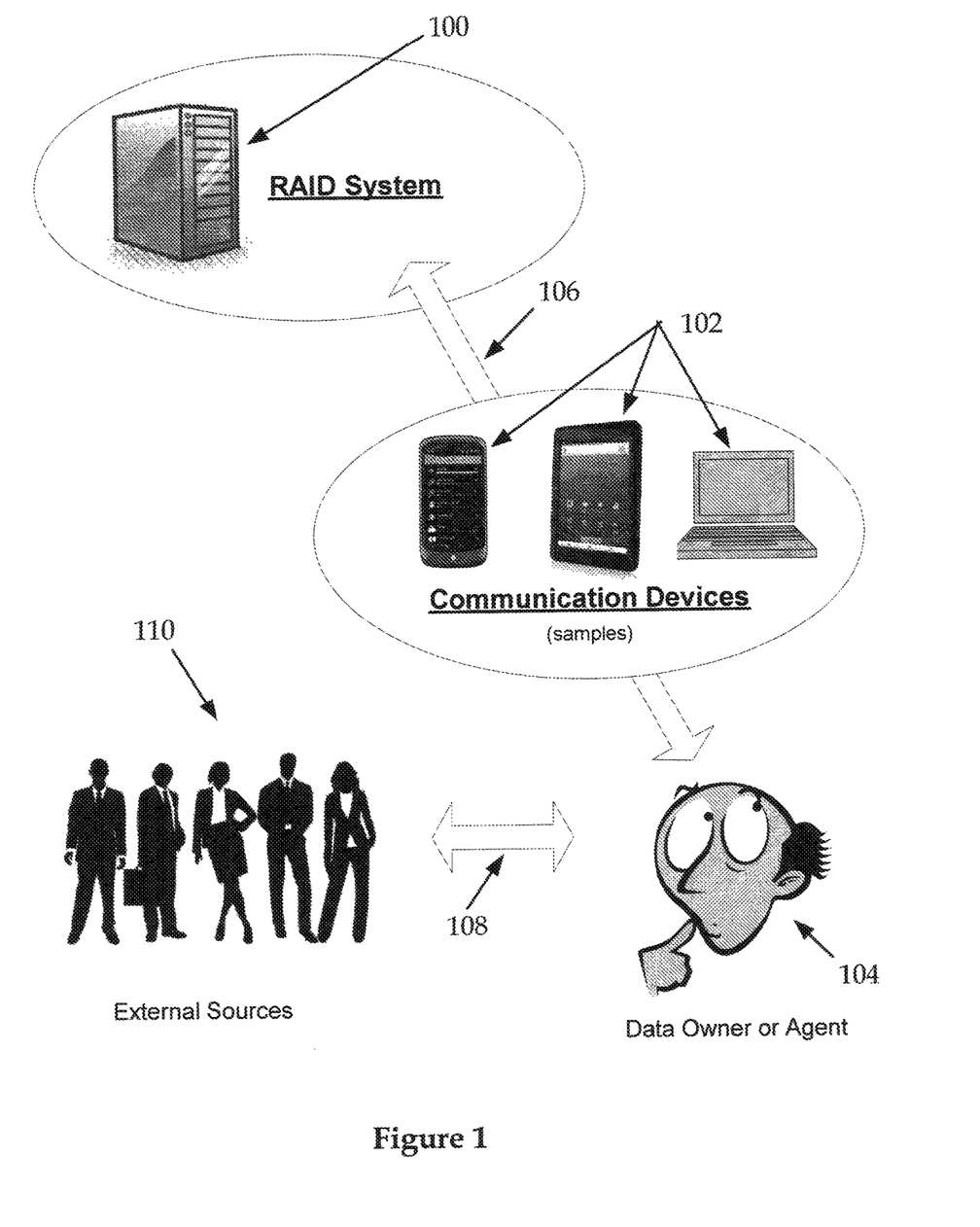
FIG. 1 illustrates a simple form of the aggregation system rapid access information database (RAID) wherein all the necessary information, documentation, and data owner's or owner authorized agent's pre-approvals to respond rapidly in the event of a time dependent need or personal emergency are on file so that any and all information requests, received from authorized requestors such as Emergency Responders, Medical/Hospital service/aid providers, and/or Law Enforcement agencies get immediate support, according to an exemplary embodiment of the invention.

Referring to FIG. 1 we illustrate an exemplary embodiment of a rapid access information database (RAID), a data aggregation system, 100 interacting with examples of Communication Devices 102 utilized by a data owner or owner authorized agents 104 to control the input 106, manipulation, and output 108 of the RAID system stored data. Any type, size, shape, or configuration of communication devices capable of wireless or wired information exchange is included herein.

At a basic level, the invention is a data "depository", which as per Merriam-Webster "a place where something is deposited especially for safekeeping" virtually like a rented storage unit but in an electronic medium. A "database" as organized, with similar information (rather than a hodge-podge of anything that can be converted to an electronic storage medium), using jpg, gif, PDF, electronic text and data files, et al.

In one embodiment, all "access" activity can be conducted thru a communication device such as a smart phone, tablet, PC et al. via secured access controlled by the data owner or owner authorized agent. Some frequently used data and information may be downloaded and reside on the user's communication devices and conduct self-checks against RAID stored data periodically, e.g., at start-up or a pre-defined frequency, perhaps user specified. Other data may be downloaded and prompt the user if actions will or potentially be needed by the user in the near future, e.g., bill payments, license renewals, document approvals and/or signings, reviewing security measures and access related aspects, etc.

All data going into a data owner's RAID system 100 database should initially come to the 104 data owner or owner authorized agent for approval before database loading said data and ensure said owner or agent is aware that a change, update, or renewal occurred. The said owner or agent can define the extent to which incoming data is scrutinized before sending the new data to the RAID system 100 database, and can simultaneously determine the retention, archiving, removal, etc. of any prior data. External Sources 110 may provide data, perhaps in existing document or electronic form, which said 104 data owner or agent may authorize or reject for RAID system 100 storage.

Figure 2:
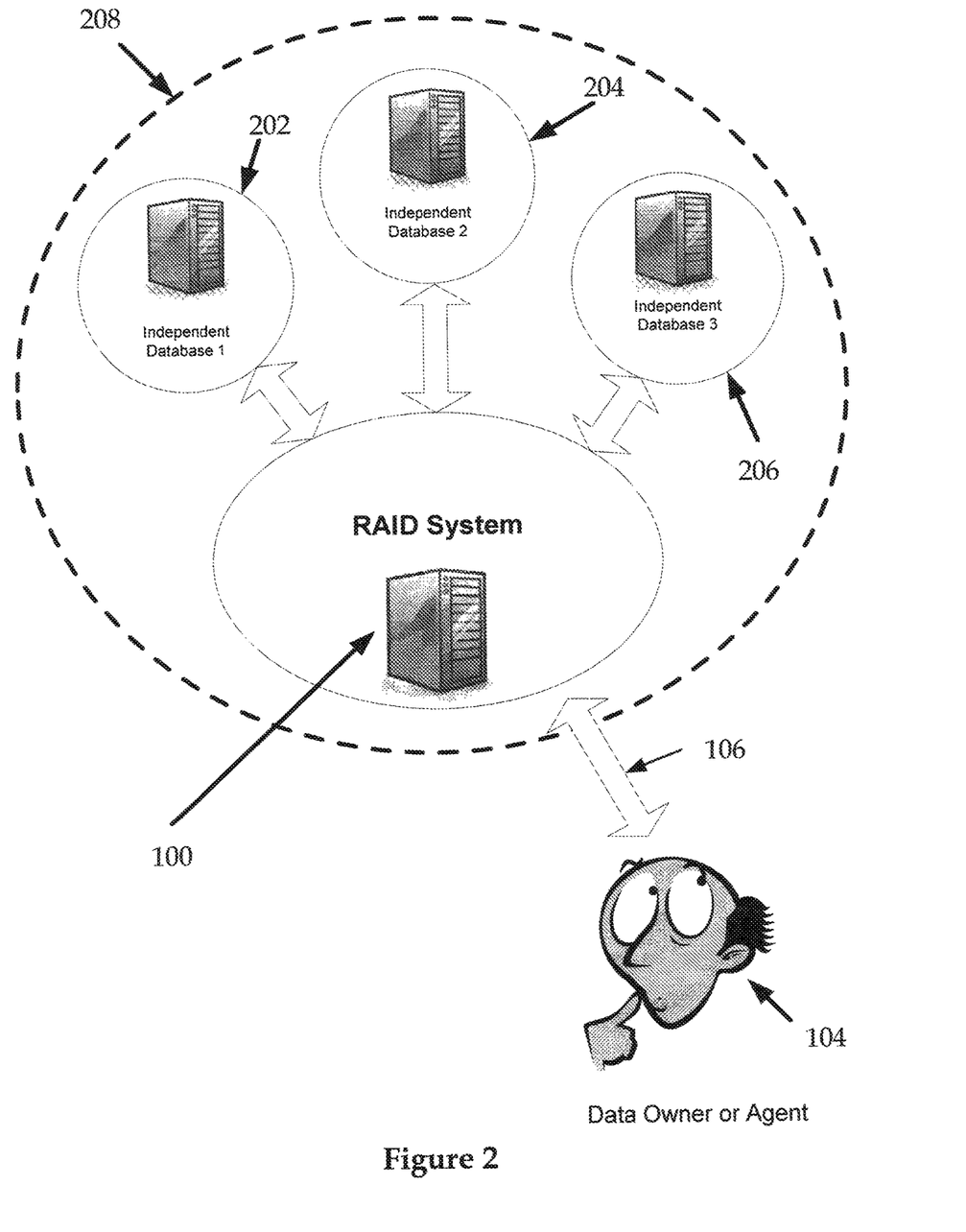
FIG. 2 illustrates how the Rapid Access Information Database Network (RAID NET) aggregation system would interface to one or more independent database operators to establish a functional interface support system in the shortest time period while maintaining the confidentiality of the data owner's data and proprietary RAID NET databases yet cooperatively providing rapid support to the data owner or authorized agents requesting data through one common RAID information access portal, according to an exemplary embodiment of the invention.

Similarly in FIG. 2, the RAID system 100 interfacing with the one or more independent operators 202, 204, 206 controlled by External Sources 110 would not be ad hoc, but would be using secure communication components or means such as secure transactional channels (be they voice, data and/or a combination) to convey clear understanding that the RAID system 100 is acting in response to the wishes of the data owner or authorized agent 104.

Just as RAID 100 is a single portal for accessing a plethora of the database owner's or owner authorized agent's 104 information, any of the Independent Databases 202, 204, and 206 could similarly be a virtual clearinghouse portal for like kind, discrete areas such as one for all insurance companies, one for all state and local government aspects, etc. The world is rapidly transitioning to virtually all life's activities being managed by interactive databases.

Figure 3:
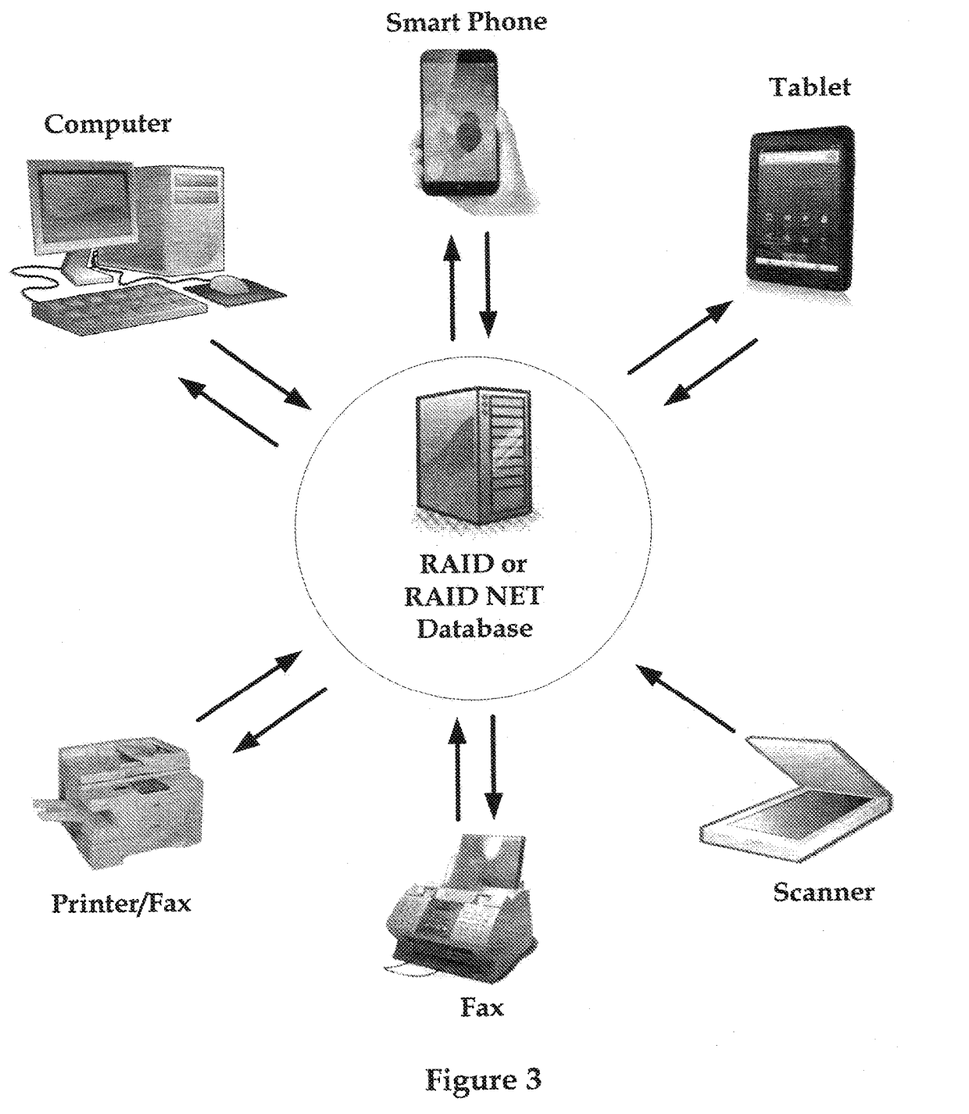
FIG. 3 conveys the most frequently used current methods for adding, extracting, and/or exchanging data with an electronic database, according to an exemplary embodiment of the invention.

FIG. 3 defines a sampling of the multitude of input and output devices presently available to upload or download data to and from the RAID system 100 or the RAID NET Databases 202, 204, or 206. Communication between RAID and any RAID NET database is not represented here because computer to computer interconnections in present technology is so commonplace and virtually only separated by security measures and access privileges.

In some cases, data can be directly transferred in its present state. Other situations may require some degree of electronic format changes for compatibility. In still other situations, data changes from a paper document to electronic format or vice versa may be required for a data exchange.

Figure 4:
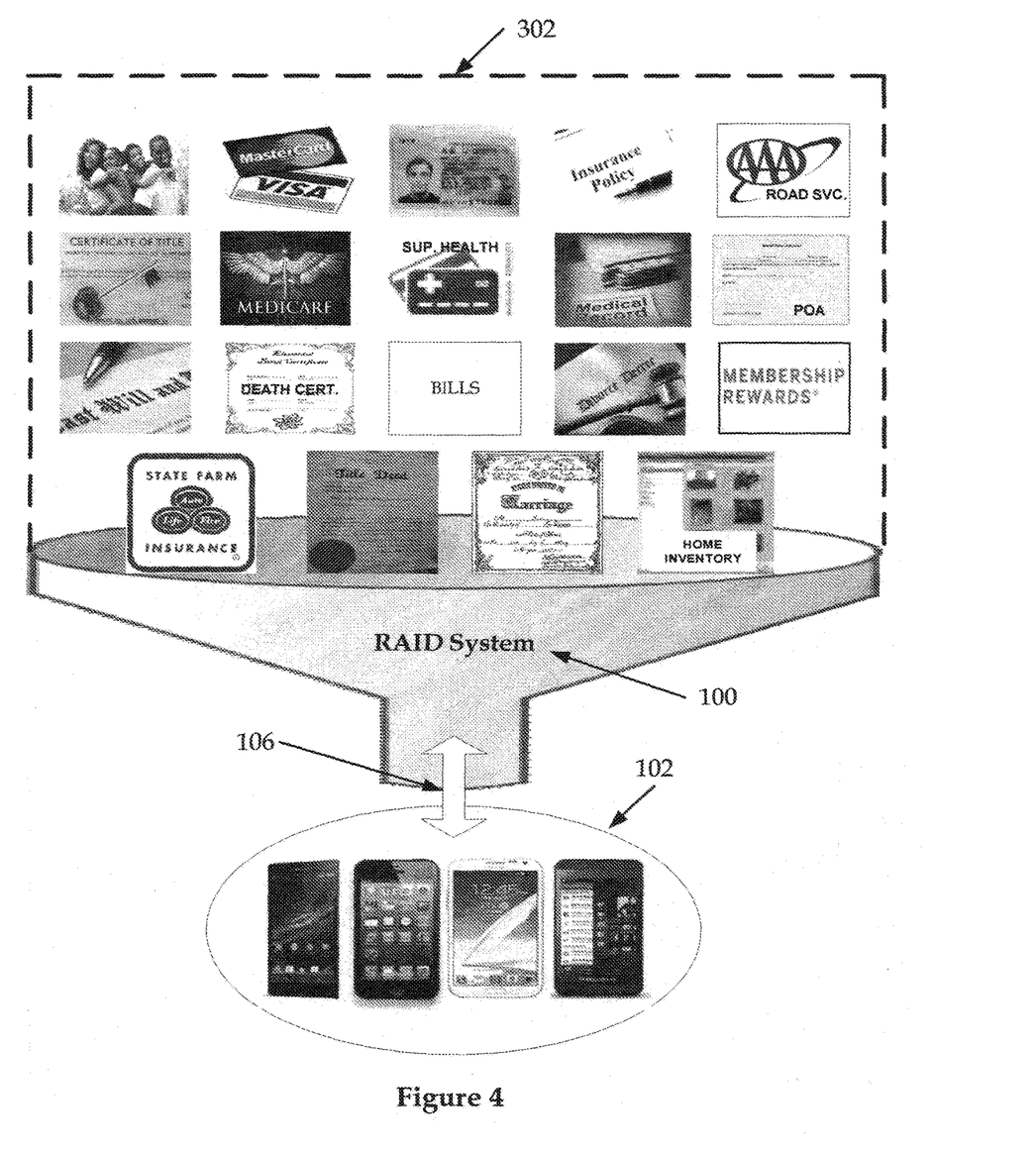
FIG. 4 conveys a sampling of the many types and kinds of diverse data which might be stored in, acted upon and managed by RAID System, according to an exemplary embodiment of the invention.

FIG. 4 conveys a sampling of the virtual "universe" of data and document types which could potentially be uploaded, downloaded, stored, created, edited, converted, manipulated and managed where/as appropriate and applicable in the RAID system 100 to effective achieve and sustain the desired control by the data owner or owner authorized agent 104 using an appropriately capable Communication Device 102.

In another embodiment we see how a sampling of the many types and kinds of diverse data which might be stored in, acted upon and managed by RAID System 100 via multiple configurations of a Communication Device 102 used by a data owner or authorized agent 104 with or without the aid of other input and/or output devices as conveyed by FIG. 3.

Because of the expanding use of smart phones, even watches, and their limited screen size, data displays on such devices may be in a hierarchal, cascading fashion or other formats with varying pictorial and/or text arrangements and/or selection features intended to enhance and simplify interactions by the database owner or owner authorized agent 104. Such Communication Device 102 features might be selectable and customizable by the Life Management System (LMS) user to enhance the usability of each device's features and the user's needs.

Figure 5:
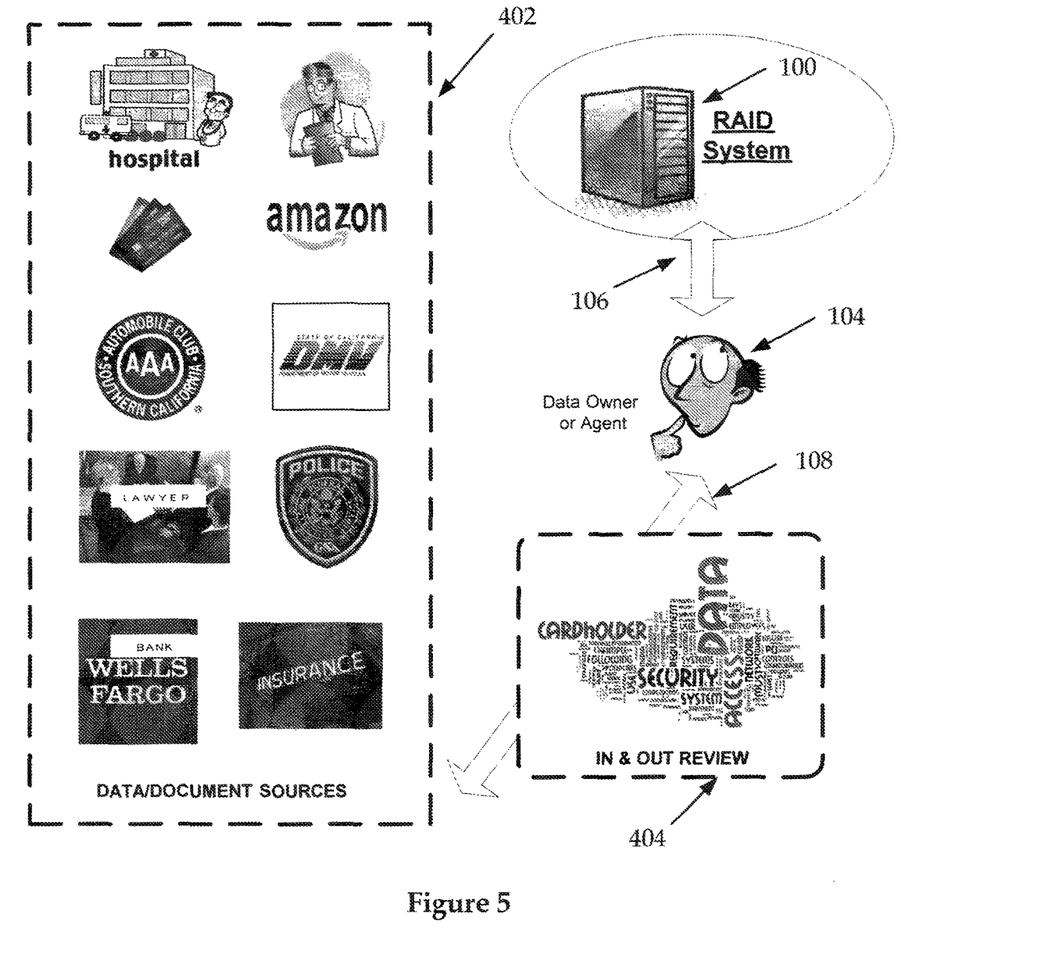
FIG. 5 exhibits a small sampling of the many types and kinds of diverse Data/Document Sources which might submit data to and receive data from the RAID System via multiple configurations of communication devices, according to an exemplary embodiment of the invention. per FIG. 3 wherein the exchange may utilize an In & Out Review 404 or toll gating activity to monitor inflow and outflow of data by the data owner or authorized agent with or without the aid of other input and output devices per FIG. 3.
Figure 6:
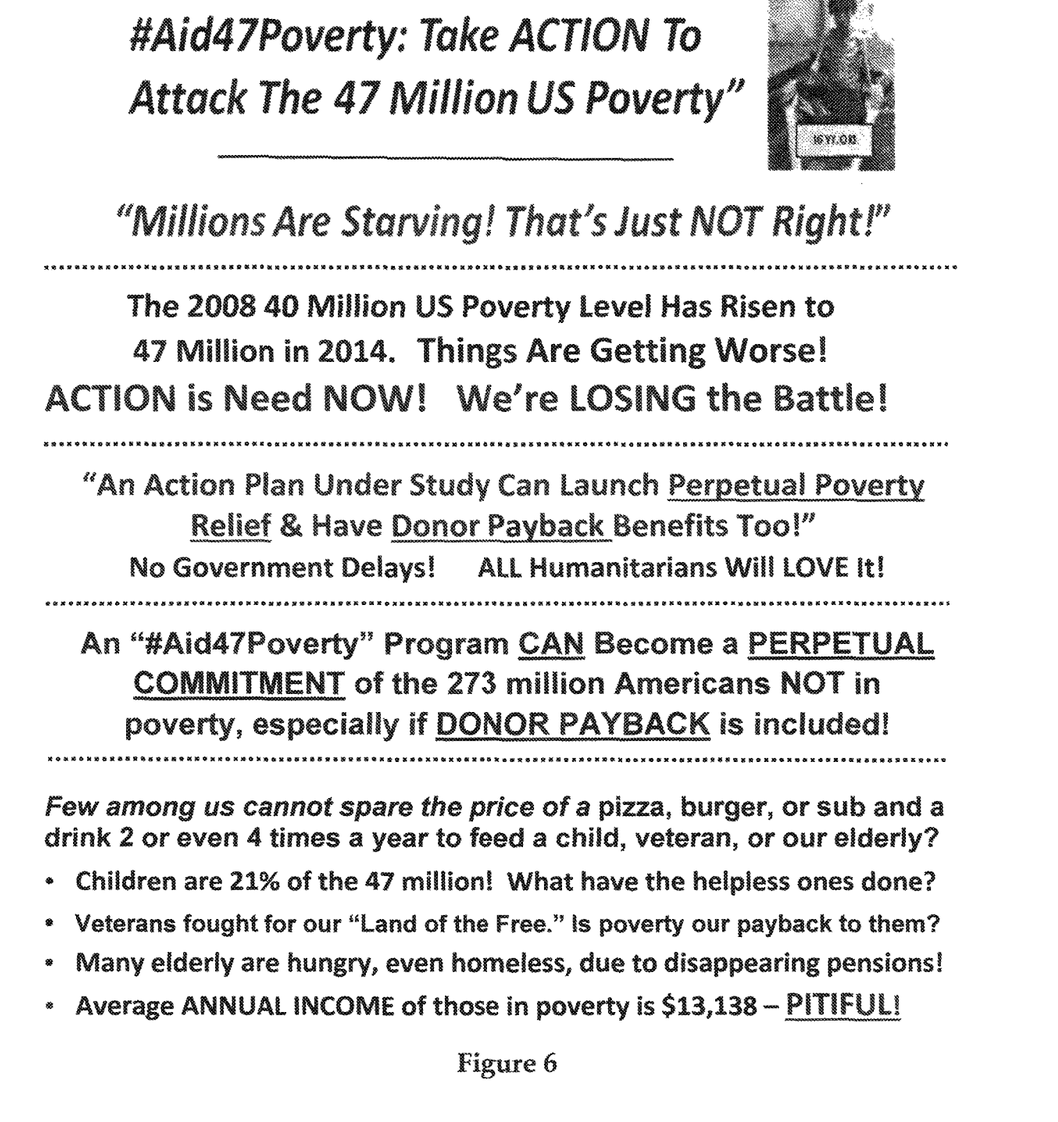

FIG. 5 provides a small sampling of specific Data and Document Sources 402 which could represent the External Sources 110 of the Independent Databases 202, 204, and 206 or like kind members of such databases, should they be collective in nature. Such exchanges between specific Data and Document Sources 402 and the owner or owner authorized agent 104 would involve an In and Out Review 404 of data to assess data exchange compatibility, revise data formats as necessary, verify validity of the exchanging entities, prevent hacking attempts, etc. As the breadth and depth of the Life Management System (LMS) matures, many more functions will likely occur at this In and Out Review 404 data exchange point.

A small sampling of the many types and kinds of diverse Data/Document Sources 402 which might submit data to and receive data from the RAID System 100 via multiple configurations of a communication devices per FIG. 3 wherein the exchange may utilize an In & Out Review 404 or toll gating activity to monitor inflow and outflow of data by the data owner or authorized agent with or without the aid of other input and output devices per FIG. 3.

Within the RAID system 100 the data may be comprised of two major types or elements, constant data and transient data elements. Constant (or semi-constant) data elements are expected to be a majority of the RAID system 100 contents. As per FIG. 4 examples, such elements might include: photos, credit/debit cards, wills, insurance policies, drivers license, health plan identity, etc. Transient data elements would include such examples as upcoming expenses/bills, e.g., insurance payments, license renewals, credit/debit card payments due, current bank balances, etc., with key transient data showing when: a) (likely electronically) authorized bank payments of all such obligations; and b) the bank actually fulfilled each payment.

In a Life Management System (LMS), the transient data elements are the most critical for active monitoring. If transient data elements are not actively managed by an In and Out Review 404 process, there can be financial repercussions, credit rating impact, and loss of services such as auto club road service, expired driver's license, or auto, life, and health/medical coverage if insurance policy lapses, etc.

Sustaining transient aspects affecting ones quality of life and stress free maintenance of same is critical in a Life Management System (LMS). The most direct approach to a RAID system 100 providing rapid support would result from a cooperative effort by the other Independent Database service 202, 204, and 206, controlled by the External Sources 110, to provide either real-time or near-real time updates and feedback through the RAID system 100 communication or other routing components, e.g. data portals or other interfacing components serving the data owner or authorized agent 104.

If appropriate access permissions and effective security methods were established, RAID system 100 could periodically connect to select independent Database services 202, 204, and 206 or vice-versa for updating if preapproved by all involved. Examples might include annual Auto Club, Food Club Warehouses, etc. where auto renewals have been preapproved. Specific reference to the concepts covered herein appear in abbreviated form at mid-page in FIG. 7.

The primary point to be conveyed is that RAID system 100 is an electronic "filing cabinet" for all documents deemed by the Life Management System (LMS) to be of significance and importance in defining and sustaining an individual's, and their family's where applicable, critical records and potentially that of their parents, their spouse's parents, et al. Paper documents used by the War Baby and Boomer generations are rapidly disappearing. Most Millenials and many Gen X's live solely by electronic devices and media. Their life's critical data may exist somewhere but it may well only presently be in electronic format, until a hard copy is sought by some situational necessity. They may not even know where the electronic copy is located or how to get it quickly. Hard copy documents used to be the primary evidence of an event, with ink signatures, notarization, hand written log recorded filings with the writer's signature or initials, etc. Today, electronic signatures are progressively being used more and more, and the electronic filings are used as evidence of an event occurrence.

This embodiment focuses on the need to locate and preserve in electronic media the critical life documents of War Babies and Boomers who kept such documents in shoe boxes under the bed, in the attic, basement or garage, or even in Aunt Sally's safe several states away. The world lived on paper documents but that is rapidly disappearing and many elderly cannot recall where they "stashed" what documents. Millenials and most Gen X's do not think paper, so they are often at a loss where and how to find their own critical documents, perhaps created by their parents during their childhood. Similarly, if they are overseeing their aging parents or a relative, they likely are not aware of what documents exist and where they are kept when a critical life event occurs with these elderly.

This Life Management System (LMS) embodiment of the RAID system 100 provides a natural, rapidly accessible virtually anywhere, consolidated like-kind grouping of documents such as insurance, financial, health and medical, et al., which can readily be in electronic format with auto prompting to insure currency. It encourages a methodical, progressive inventorying of all life's document before emergency and life changing events occur, so that when critical events occur consolidated medical records, current medications, power-of-attorney, end-of-life wishes, etc. are immediately available rather than trying to discover what information does exist and where it is located. Lives can be saved!

In another embodiment RAID system 100 can store and inventory all the documents typically carried in a wallet by storing and categorizing all sides of documents such as driver's license, social security card, car insurance coverage, credit cards, auto and food club membership cards, shopper's reward points cards, on and on. Such may not presently be acceptable as legal evidence in all cases but would convey the existence of such cards elsewhere located to be presented later where/as necessary. Life is gradually transitioning to a totally electronic world and the all inclusive electronic Life Management System (LMS) will fulfill the interactive, homogenous electronic universe as the use of paper document disappears into the history books.

A data owner or owner authorized agent 104 can also retrieve and print RAID system 100 stored data such as document copies when needed, e.g., point of sale of a RAID inventoried items owned by the data owner, proof that one owns something such as reaching thru RAID to the RAID NET database at DMV to show the data owner does own a particular vehicle or access town records to show the data owner's home was free and clear, etc. In such an embodiment, the invention enables the concept of an electronic "universal" filing cabinet (RAID) "holding" all one's stuff, be it yourself as the data owner 104, or a relative or other for which you are the authorized agent, perhaps elderly parents, and able to reach the universe beyond RAID NET for all the other stuff related to the data owner of record life's holdings etc. One "portal access" opens the data owner's UNIVERSE.

A means or components will be provided for new RAID system 100 data owners to establish access privileges in a likely broad based RAID network as well as the RAID NET databases associated with the new user's data access requirements. Such initial and subsequent access will include appropriate security measures so as not to jeopardize the resident data/information of all other RAID users. The individual RAID NET database owners may reserve the right to designate their own security access measures directly with the individual RAID system 100 data owner and or owner authorized agents.

As implied throughout, data owners utilizing the RAID database may designate authorized agents such as a spouse, relatives, attorneys, and the like to access some or all of their stored data/information utilizing RAID defined guidelines and practices. Such extended access authorization will utilize appropriate access authorization means as will be utilized for the data owner of record on file with RAID or designated by the RAID NET database owners.

Other authorized agents such as the Independent Database service providers 202, 204, and 206 may be approved by the data owner for submitting discrete, specific information updates such as insurance policy details, medical record changes, legal documents, contracts, club memberships such as AAA, et al. All such submissions would be held in suspension for review and approval by the specific data owner before being added to the data owner's RAID system 100 database. The data owner may define other security measures to be utilized for the control of such additions.

The data owner of record will define access privileges consistent with RAID aligned security access measures for authorized agents to manage access to the data owner's RAID or RAID NET resident data. In addition, the data owner will designate what, if any, of the owner's data may be altered in any way by an authorized agent on the owner's behalf other than read and/or print privileges. Any changes/additions made in RAID on the owner's behalf will be RAID designated as "pending" until the owner reviews and approves said changes/additions at a future RAID sign-on. Should owner's approval not be possible, the individual holding Power-of-Attorney from the owner will disposition said changes, should it be necessary.

The central contact-Rapid Access Information Database (RAID) system for data aggregation will be the primary access point for a data owner or owner authorized agent 104 to interact and communicate with RAID 100 and all RAID NET 202, 204, and 206 databases. It is expected that RAID and RAID NET access will occur by wireless or cabled electronic communication via a smart phone, tablet, personal computer, or access terminals allowing electronic communication.

The data owner's rapid access device, such as smart phone, tablet, PC, etc. may store in its self-contained system select information which might be called upon frequently or is needed to be available rapidly to serve the intended purposes of the data owner. In such cases, the data owner would manually or automatically, perhaps selectively, "sink" this resident data on the rapid access device periodically with RAID or the appropriate RAID NET database to maintain data up-to-date and aligned across all applicable databases. Such a "sink" function may be prompted or the need for same queried by RAID when the rapid access device is first connected to the RAID or a RAID NET database.

When RAID is accessed, it will include a logic and/or lookup capability to determine if the owner's or authorized agent's information request characteristics dictate or align with the defined information type which resides in RAID or a RAID NET database and initiate communication with the designated topic focal area, request more input information to resolve the appropriate database, or indicate the requested information type is not RAID or RAID NET present.

The central contact-Rapid Access Information Database (RAID) portal system for data aggregation will permit data owners certain data manipulation privileges such as but not limited to data input, removal, editing, reformatting, moving, etc. consistent with RAID and RAID NET member allowances and guidelines. "Data" is used generically throughout to include information of any type be it numeric, text, document copy (e.g., PDF), pictures (e.g., jpg, gif), fax, lists, et al. For RAID and RAID NET access, manipulation, and handling purposes, data will typically reside in a format suitable for electronic database applications.

As electronic technology and software capabilities evolve, select documents may allow direct editing or peripheral edits added in or around a data field or elsewhere to accommodate and simplify "on the go" Life Management System (LMS) utilization and maximize system flexibility. Methods may also be defined to designate pending changes still being finalized for applications such as revisions to wills, contracts, etc. Data and documents provided from outside sources could include varying methods and levels of access control to manage and track edits and updates either by or for the data owner.

Each RAID NET database owner may define specific guidelines for permitting data owners and owner authorized agents to enter, manipulate, change, retrieve, remove, etc. data on their database. Such access may be either through the RAID portal access or direct access to their database via their specific access portal, guidelines and related requirements be it direct access by the data owner or authorized agent, or with guidance and/or assistance from the database owner.

For immediate support where/as needed and available, the RAID portal can rapidly communicate with all appropriate RAID NET databases. For access speed and accuracy, such input communication may incorporate a cascading menu from broadest to narrowing terms until the target information is either located or determined not to exist. This target information will define whether the requested data/information resides on the RAID database or a RAID NET database.

In addition to RAID, the respective databases within RAID NET will have prior authorization, or immediately procure it, from the inquiring data owner or owner authorized agent they service to procure and deliver the requested data. In some situations, the database owner may pre-approve select updating by a RAID NET member without specific, discrete authorization where the data merely increments from one year's membership reference to the next, etc.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity appropriate for a provisional patent application. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

The invention claimed is:

1. A computer implemented rapid access information database (RAID) portal system for data collection and aggregation, said system comprising:
   a rapid access information database (RAID) portal comprised of one or more central RAID servers configured to access directly or with assistance to external data, said RAID servers isolated from direct user access and configured to establish a pre-authorized and approved direct or assisted interface to one or more external proprietary services having systems and databases to obtain either permanent or transient data elements within said proprietary services; said proprietary services servers or assisted access forming a network (RAID NET);
   interfacing components for data owners or authorized agents to access said RAID portal system and legally authorize the level and conditions under which said permanent or transient data elements residing in said one or more proprietary services databases may be accessed directly or with assistance and provided through said RAID portal system;
   interfacing and action originating components allowing said data owners or authorized agents to define and initiate a broadcast or query about the permanent or transient data elements for one or more of their data types retained by said RAID portal to said RAID NET;
   communication components for secure interfacing to said RAID portal by data owners, authorized agents or their intermediaries utilizing said RAID portal system defined access practices;
   legal clearance components to establish the valid specific legal level of access of each said intermediary to each said permanent or transient RAID NET stored data elements and to approve or deny said intermediary's access to said permanent or transient data elements; and
   RAID portal components to aggregate, locate, and compare any responses about said permanent or transient data elements from said RAID NET and communicate appropriate permanent or transient data elements to the appropriately cleared data owner, authorized agent or their intermediaries.

2. The system of claim 1, wherein
   said permanent data elements include attributes comprised of at least one of characteristics such as Owner's information (including name, address, phone numbers), owner authorized agent's information (incl. name, address, phone numbers); and
   said transient data elements include non-fixed attributes that change over time or through the ongoing activities or operations.

3. The system of claim 2, wherein
   one or more said owner, authorized agent or their intermediary use said RAID access to request the exercise of control over said data directly, if so authorize, or through the RAID portal to said external proprietary services system's connection to said data system.

4. The system of claim 3, wherein
   said legal clearance components comprise written, electronic or verbal legal clearance components defining extent of access to the RAID servers and to said independent external proprietary services systems and databases as applicable.

5. The system of claim 4 further comprising:
   one or more system modules using said RAID access as the system interfacing components to execute a data owner's or authorized agent's request to perform at least one of the following or similar functions by one or more of the data controls;

locate data in the RAID NET system, turn on access, read, edit, delete type functions, turn off access, read, edit, delete type functions, activate RAID portal monitoring for specific activities or disable some portion of RAID portal monitoring.

6. The system of claim 5 further comprising:

one or more system modules using said RAID access as the system interfacing components to allow an intermediary to execute an authorized owner's or authorized agent's requests to respond in a pre-defined manner on their behalf to transient data differing from at least one of the following or similar conditions; said data being outside an owner's or authorized agent's expected parameter zone, said data being utilized or controlled in a manner not consistent with owner's or authorized agent's permission or intended use, one or more activities or a frequency of activities violating or exceeding a specified criteria or threshold.

7. The system of claim 4 further comprising:

one or more system modules using said RAID access as the system interfacing components for an intermediary who is permitted to exercise an owner's or authorized agent's request to respond in a pre-defined manner on their behalf to automatically alert one or more intermediaries after an uncommon event or activity is observed, or similar unexpected change in status occurs.

8. A computer implemented rapid access information database (RAID) portal method for data collection and aggregation, said method comprising:

providing access to a rapid access information database (RAID) portal comprised of one or more central RAID servers configured to access directly or with assistance to external data, said RAID servers or contact points isolated from direct user access and configured to establish a pre-authorized and approved direct or assisted interface to one or more external proprietary services having systems and databases to obtain either permanent or transient data elements within said proprietary services; said proprietary services servers or assisted access forming a network (RAID NET);

providing interfacing components for data owners or authorized agents to access said RAID portal system and legally authorize the level and conditions under which said permanent or transient data elements residing in said one or more proprietary services databases may be accessed directly or with assistance and provided through said RAID portal system;

providing interfacing and action originating components allowing said data owners or authorized agents to define and initiate a broadcast or query about the permanent or transient data elements for one or more of their data types retained by said RAID portal to said RAID NET;

providing communication components for secure interfacing to said RAID portal by data owners, authorized agents or their intermediaries utilizing said RAID portal system defined access practices;

providing legal clearance components to establish the valid specific legal level of access of each said intermediary to each said permanent or transient RAID NET stored data elements and to approve or deny said intermediary's access to permanent or transient data elements; and providing RAID portal components to aggregate, locate, and compare any responses about said permanent e or transient data elements from said RAID NET and communicate appropriate permanent or transient data elements to the appropriately cleared data owner, authorized agent or their intermediaries.

9. The method of claim 8, wherein said permanent data elements include attributes comprised of at least one of characteristics such as Owner's information (including name, address, phone numbers), owner authorized agent's information (incl. name, address, phone numbers); and said transient data elements include non-fixed attributes that change over time or through the ongoing activities or operations.

10. The method of claim 9, wherein one or more said owner, authorized agent or their intermediary use said RAID access to request the exercise of control over said data directly, if so authorize, or through the RAID portal to said external proprietary services system's connection to said data system.

11. The method of claim 10, wherein said legal clearance components comprise written, electronic or verbal legal clearance components defining extent of access to the RAID database and to said independent external proprietary services systems and databases as applicable.

12. The method of claim 11 further comprising:

one or more system modules using said RAID access as the system interfacing components to execute a data owner's or authorized agent's request to perform at least one of the following or similar functions by one or more of the data controls; locate data in the RAID NET system, turn on access, read, edit, delete type functions, turn off access, read, edit, delete type functions, activate RAID portal monitoring for specific activities or disable some portion of RAID portal monitoring.

13. The method of claim 12 further comprising:

one or more system modules using said RAID access as the system interfacing components to allow an intermediary to execute an authorized owner's or authorized agent's requests to respond in a pre-defined manner on their behalf to transient data differing from at least one of the following or similar conditions; said data being outside an owner's or authorized agent's expected parameter zone, said data being utilized or controlled in a manner not consistent with owner's or authorized agent's permission or intended use, one or more activities or a frequency of activities violating or exceeding a specified criteria or threshold.

14. The method of claim 11 further comprising:

one or more system modules using said RAID access as the system interfacing components for an intermediary who is permitted to exercise an owner's or authorized agent's request to respond in a pre-defined manner on their behalf to automatically alert one or more intermediaries after an uncommon event or activity is observed, or similar unexpected change in status occurs.

15. A non-transitory computer-readable medium embodying a program executable in at least one computing device, the program, when executed, causing the at least one computing device to at least:

access a rapid access information database (RAID) portal comprised of one or more central RAID servers configured to access directly or with assistance to external data, said RAID servers isolated from direct user access and configured to establish a pre-authorized and approved direct or assisted interface to one or more external proprietary services having systems and databases to obtain either permanent or transient data elements within said proprietary services; said proprietary services servers or assisted access forming a network (RAID NET);

interact with interfacing components for data owners or authorized agents to access said RAID portal system and legally authorize the level and conditions under which said permanent or transient data elements residing in said one or more proprietary services databases may be accessed directly or with assistance and provided through said RAID portal system;

interact with interfacing and action originating components allowing said data owners or authorized agents to define and initiate a broadcast or query about the permanent or transient data elements for one or more of their data types retained by said RAID portal to said RAID NET;

access communication components for secure interfacing to said RAID portal by data owners, authorized agents or their intermediaries utilizing said RAID portal system defined access practices;

employ legal clearance components to establish the valid specific legal level of access of each said intermediary to each said permanent or transient RAID NET stored data elements and to approve or deny said intermediary's access to said permanent or transient data elements; and employ RAID portal components to aggregate, locate, and compare any responses about said permanent of or transient data elements from said RAID NET and communicate appropriate permanent or transient data elements to the appropriately cleared data owner, authorized agent or their intermediaries.

16. The non-transitory computer-readable medium embodying a program executable in at least one computing device of claim 15, wherein said permanent data elements include attributes comprised of at least one of characteristics such as Owner's information (including name, address, phone numbers), owner authorized agent's information (incl. name, address, phone numbers); and said transient data elements include non-fixed attributes that change over time or through the ongoing activities or operations.

17. The non-transitory computer-readable medium embodying a program executable in at least one computing device of claim 16, wherein one or more said owner, authorized agent or their intermediary use said RAID access to request the exercise of direct control over said data, if so authorize, or through the RAID portal to said external proprietary services system's connection to said data system.

\* \* \* \* \*